United States Patent [19]

Steele et al.

[11] 4,329,097

[45] May 11, 1982

[54] ADJUSTABLE POSITIVE MEANS FOR LOCKING STUDS AND NUTS HAVING CRITICAL PRESTRESS VALUE

[75] Inventors: Robert D. Steele; Duane E. Doll, both of York, Pa.

[73] Assignee: Allis-Chalmers Corporation, Milwaukee, Wis.

[21] Appl. No.: 150,155

[22] Filed: May 15, 1980

[51] Int. Cl.³ .............................................. F16B 39/02
[52] U.S. Cl. ........................................ 411/88; 411/93; 411/102
[58] Field of Search ............... 411/86, 87, 88, 90, 411/91, 92, 93, 94, 95, 96, 97, 98, 99, 100, 101, 102, 117, 120, 121, 191, 197, 201

[56] References Cited

U.S. PATENT DOCUMENTS

| | | | |
|---|---|---|---|
| 147,243 | 2/1874 | Lamb | 411/98 |
| 245,733 | 8/1881 | Long | 411/120 |
| 248,921 | 11/1881 | Darby et al. | 411/95 |
| 266,165 | 10/1882 | Ladd | 411/96 |
| 363,196 | 5/1887 | Bay et al. | 411/95 |
| 1,095,928 | 5/1914 | Rudd et al. | 411/95 |
| 2,101,678 | 12/1937 | Herschmann | 411/197 |
| 2,359,555 | 10/1944 | Herreshoff et al. | 411/100X |
| 2,423,918 | 7/1947 | Wohlhieder | 411/97 |
| 2,620,008 | 12/1952 | Mallard | 411/87 |

FOREIGN PATENT DOCUMENTS 1500850  9/1969  Fed. Rep. of Germany ...... 411/102

Primary Examiner—Thomas J. Holko
Attorney, Agent, or Firm—Robert C. Jones

[57] ABSTRACT

A pair of nut locking cups are engaged on the external surfaces of a pair of nuts and are constructed so that the outside radius of a cup is equal to one-half of the distances between adjacent studs to allow the cups to be placed on the nuts regardless of nut position with the outside radii of the cups remaining in contact with each other; a locking bar is positioned across the two adjacent studs with the studs being welded to the bar; the locking cups are also welded to the locking bar and thus form a positive lock between the studs and the anchor point for the nut lock cups.

2 Claims, 5 Drawing Figures

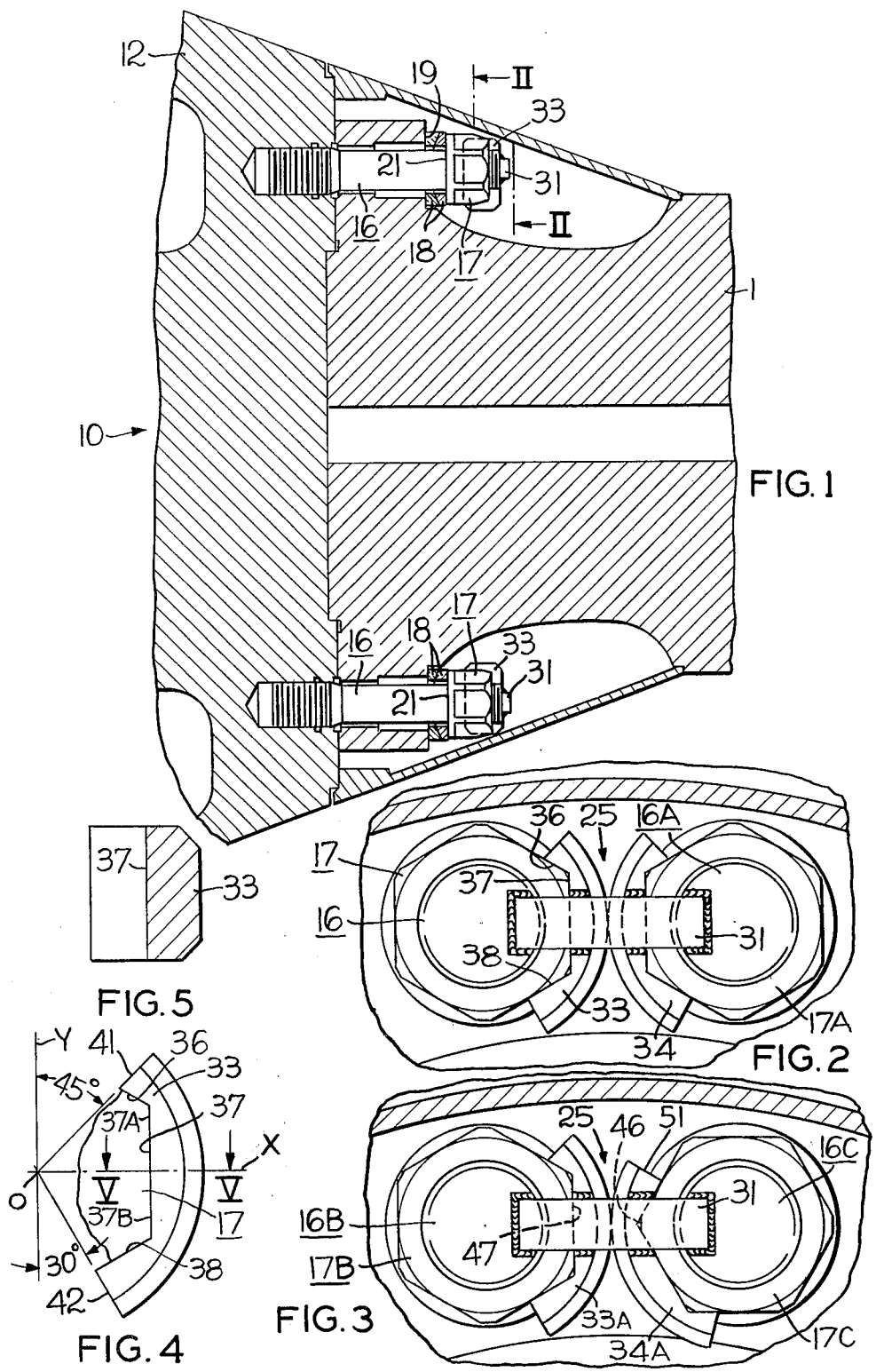

ADJUSTABLE POSITIVE MEANS FOR LOCKING STUDS AND NUTS HAVING CRITICAL PRESTRESS VALUE

BACKGROUND OF THE INVENTION

In hydraulic turbines especially of the type in which the major components are submerged in water, problems arise with the fasteners used to secure components together. Bolts and nuts which are used gradually fail over the years due to fatigue and finally break. Through investigation it was found that the reason bolts and nuts failed was because of the cyclic loading and not being properly prestressed. To counter this condition studs were substituted for bolts and separate nuts engaged on the studs. To obtain the necessary high strength, the studs are of a stainless steel alloy which can be prestressed. The nuts could not be of the same material for they would gall and friction-weld to the studs. Thus, the removal of the nut from the stud could only be accomplished by cutting the nut and this damages the stud requiring that the stud be drilled out. To eliminate this problem the nut was manufactured of a nonweldable material and, thus, when engaged to the stud, would not gall or friction-weld thereto. However, this created another problem of maintaining the nut in prestressed relationship on the prestressed stud.

OBJECTS OF THE INVENTION

To provide an adjustable and positive means of locking studs and nuts having a very critical prestress value.

Still another object of this invention is to provide nut locking means without the necessity of having to know the angular position of each nut when prestress is achieved.

Yet another object of the present invention is to provide means for locking of nuts manufactured of a material not suitable for welding.

DESCRIPTION OF THE DRAWINGS

FIG. 1 is a fragmentary view of a portion of a bulb turbine partly in elevation and partly in section showing the prestressed studs and nuts and the arrangement for achieving a positive lock of both studs and nuts.

FIG. 2 is fragmentary end view of the arrangement shown in FIG. 1 taken in a plane represented by the line II—II in FIG. 1 showing two adjacent studs and nuts in prestressed and locked position;

FIG. 3 is a view similar to FIG. 2 but showing the nuts in different angularly orientated relationship with respect to each other;

FIG. 4 is an enlarged fragmentary view showing a portion of a nut and an associated locking cup showing the geometric relationship of the nut and cup; and, FIG. 5 is an enlarged fragmentary view of a locking cup taken in the plane represented by the line V—V in FIG. 4.

DESCRIPTION OF THE INVENTION

As shown in FIG. 1 various components of a bulb turbine 10 such as the main turbine shaft 1 and the runner hub 12 are releasably secured together by a radial row of studs generally identified by the number 16 and associated nuts generally identified by the number 17 in FIG. 1. The studs 16 are located in circular array and are spaced very accurately from center to center. In the particular application herein shown, the studs are within a couple of thousandths of an inch center to center, which is about one-half the thickness of a piece of writing paper. The studs 16 are not special, that is they are not fitted studs that take up the space of the stud receiving openings but are plain studs with reduced shanks for high prestress. Each stud 16 receives a set of complementary spherical washers 18. The set of spherical washers permits the alignment of the shoulder surface 19 to the abutment face 21 of the nut 17. The prestress of the stud 16 is accomplished by heating of the stud. When the desired amount of prestress is accomplished, the nut 17 is tightened on the threaded extending end of the stud in engagement with the spherical washer set which automatically adjusts the bearing face alignment.

To lock the nuts 16 in clamping position there is provided a unique lock arrangement 25 which is adapted to lock a pair of adjacent nuts in clamping position on their associated studs. The nuts 17 are of a non-weldable material in contrast to the studs 16 which are weldable. Thus, the nuts 17 will not gall on the threaded ends of the studs. However, because the nuts 17 are of a material that is not weldable, the nuts cannot be welded to the studs. To solve this problem the lock arrangement 25 was conceived. As shown the lock arrangement 25 includes a bar member 31 of a length to span the space between the axes of two adjacent studs 16. As shown the ends of the locking bar 31 are welded to the top surfaces of associated adjacent studs. Thus, the bar 31 operates as a positive lock between adjacent studs and prevents inadvertent rotation of the studs.

To prevent the associated adjacent nuts 17 and 17A, FIG. 2, from rotating there is provided nut locking cups 33 and 34. The cups 33 and 34 are identical and a description of the cup 33 will apply to cup 34. As shown, the cup 33 is constructed of a portion of a tube having an outside radius that is one-half of the distance between center axes of adjacent studs. This allows the locking cups to be placed against the nuts regardless of the angular position of the associated nuts 17 and 17A.

As viewed in FIG. 4 the cup 33 is shown in relation to the axes OX and OY of coordinates which are perpendicular to each other. In the arrangement shown in FIG. 4, the OX coordinate is perpendicular to the face 37 and divides it into two equal parts 37A and 37B. Thus, the arcuate length between the radial face 41 and the X-axis of the cup 33 is shorter than the arcuate length between the radial face 42 and the X-axis. This then makes the length of the face 36 shorter than the length of the face 38.

With this arrangement the two lock cups 36 and 36A, as shown in FIG. 3, can be utilized with associate lock nuts 17B and 17C, respectively, that are not orientated with surface flats directly opposite to each other. As shown in FIG. 3, the nut 17C is orientated with respect to the nut 17B with a corner 46 directly opposite a flat face 47 of the nut 17B. This would result in the shorter length of a locking cup being positioned under the locking bar 31 so that insufficient material of the locking cup is available to receive the weld material. To overcome this condition a locking cup, such as the cup 34A shown in FIG. 3, is turned end-for-end. This locates the longer end 51 of cup 34A under the locking bar 31 so that sufficient area of the locking cup 34A is presented to receive the weld material. The end-for-end switching of cup 34A does not disturb the surface abutting relationship between the two cups 33A and 34A.

The locking cup 33 has its concave inner surface milled to reflect the hex surfaces of the nut 17. As shown in FIGS. 2 and 3, the inner surface of the cup includes three surfaces 36, 37 and 38 which are complementary to the hex surfaces of the nut 17. Thus, with the lock cups 33 and 34 engaged with the associated nuts 17 and 17A and with their outside surfaces in contact with each other, as shown in FIG. 2, the lock cups 33 and 34 can be welded to the associated nuts 17 and 17A. This is accomplished through the bar 31 which extends from the stud 16 to the stud 16A overlying portion of the nuts 17 and 17A and the lock cups 33 and 34. The bar 31 is then welded to the lock cups 33 and 34 and also to the studs 16 and 16A. Thus, the adjacent nuts 17 and 17A are welded together via the bar 31 and are prevented from rotating thereby. The locking cups 33 and 34 are also welded to the stud locking bar 31 thus achieving a positive lock of both the studs 16 and 16A and the nuts 17 and 17A.

The embodiments of the invention in which an exclusive property or privilege is claimed are defined as follows:

1. An adjustable and positive locking means for locking studs and associated hex-nuts having critical prestress value comprising;

a stud locking bar constructed and arranged to extend between two adjacent studs in a manner that the ends of said bar rest upon the exposed ends of the two adjacent studs;

means to secure said locking bar to the ends of the studs to form a positive lock between the studs;

a first nut locking cup engageable with a hex-nut on one of the studs;

a second nut locking cup engageable with the hex-nut on the other of the studs;

means to secure said first and second nut locking cups to said locking bar to prevent rotation of the stud nuts;

wherein said first and second nut locking cups are identical and each is constructed with concave internal surfaces that closely engage with hex surfaces on the associated stud nut; and wherein each of said nut locking cups are constructed with an outside radius that is equal to one-half the distance between the associated adjacent studs so that the outside surfaces of the nut locking cups will remain in contact with each other regardless of the angular relationship of the hex-nuts.

2. An adjustable and positive locking means according to claim 1 wherein said concave internal surfaces of each nut locking cup present at least one flat surface which is equal in length to a flat surface on the hex-nut and two other flat surfaces which are shorter in length than the length of the flat surfaces on hex-nut, said shorter length flat surfaces being disposed adjacent and contiguous to the ends of said one flat surface which is equal in length to a flat surface on the hex-nut, said shorter length flat surfaces being orientated angularly so as to engage associated flat surfaces on said hex-nut.

* * * * *